T. G. PLANT.
WORK SUPPORT FOR HEELING MACHINES.
APPLICATION FILED NOV. 24, 1909.

958,300.

Patented May 17, 1910.

8 SHEETS—SHEET 3.

Witnesses:
Amelia M. Ross
Marion F. Kimball

Inventor:
Thomas G. Plant
by Robt. F. Hains.
Atty.

T. G. PLANT.
WORK SUPPORT FOR HEELING MACHINES.
APPLICATION FILED NOV. 24, 1909.

958,300.

Patented May 17, 1910.
8 SHEETS—SHEET 4.

Witnesses:
Amelia M. Ross
Marion F. Kimball

Inventor:
Thomas G. Plant,
by Robt. P. Haines
Atty.

T. G. PLANT.
WORK SUPPORT FOR HEELING MACHINES.
APPLICATION FILED NOV. 24, 1909.

958,300.

Patented May 17, 1910.
8 SHEETS—SHEET 5.

T. G. PLANT.
WORK SUPPORT FOR HEELING MACHINES.
APPLICATION FILED NOV. 24, 1909.
958,300.
Patented May 17, 1910.
8 SHEETS—SHEET 8.
Fig. 8.
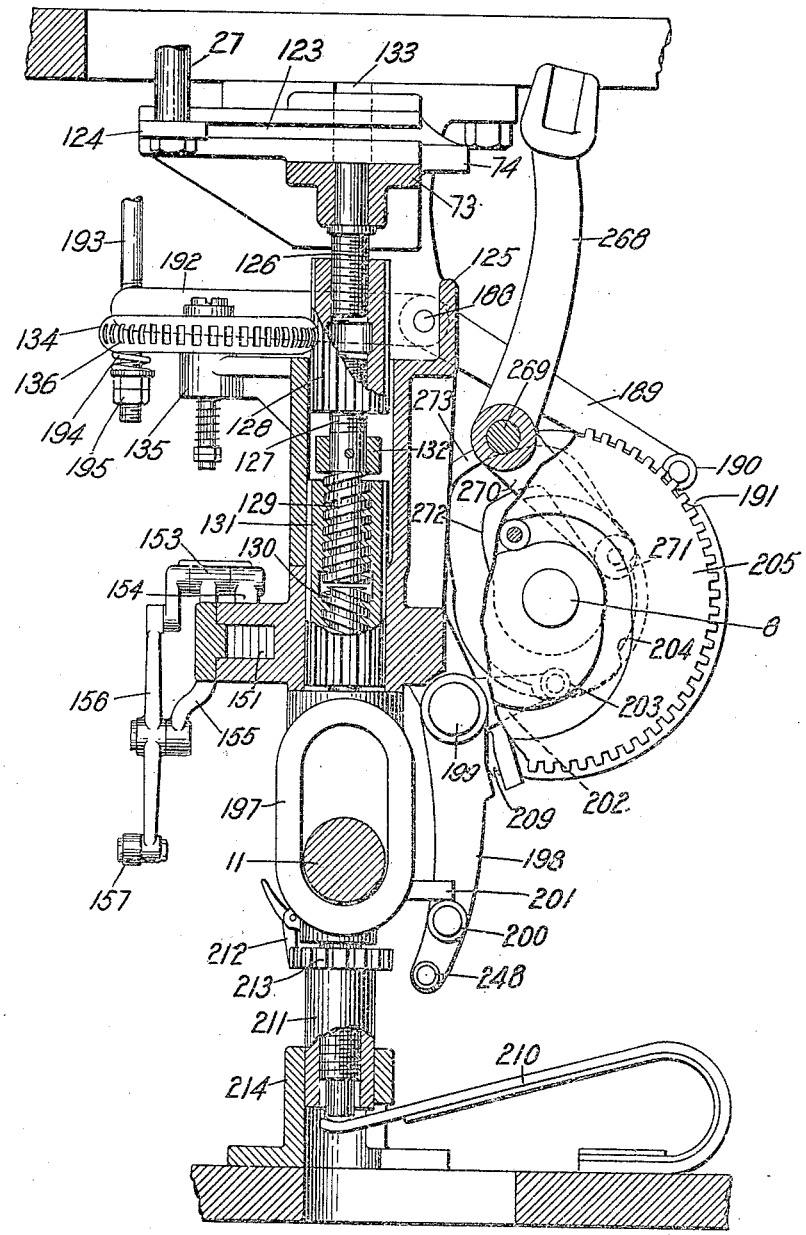
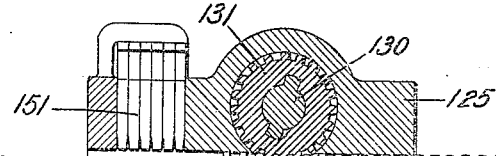
Fig. 9.
Witnesses:
Amelia M. Ross
Marion D. Kimball
Inventor,
Thomas G. Plant
by Robt. P. Norris
Atty.

UNITED STATES PATENT OFFICE.

THOMAS G. PLANT, OF BOSTON, MASSACHUSETTS.

WORK-SUPPORT FOR HEELING-MACHINES.

958,300.  Specification of Letters Patent.  Patented May 17, 1910.

Original application filed February 19, 1909, Serial No. 478,954. Divided and this application filed November 24, 1909. Serial No. 529,703.

*To all whom it may concern:*

Be it known that I, THOMAS G. PLANT, a citizen of the United States, residing at Boston, in the county of Suffolk and State of Massachusetts, have invented an Improvement in Work-Supports for Heeling-Machines, of which the following description, in connection with the accompanying drawings, is a specification, like characters on the drawings representing like parts.

This invention relates to heeling machines, and, while adapted for use in various types of such machines, is herein disclosed in a machine for attaching loaded heels to shoes and thereafter for spanking on the toplift.

The aims and purposes of the present invention are to improve the construction and operation of machines of the above general type, substantially as set forth in my application, Ser. No. 478,954, filed February 19, 1909, of which this is a division, the claimed features of this application being directed to the work support and its associated parts, whereby the shoe is properly positioned and held for the action of the heeling devices.

Figure 1:
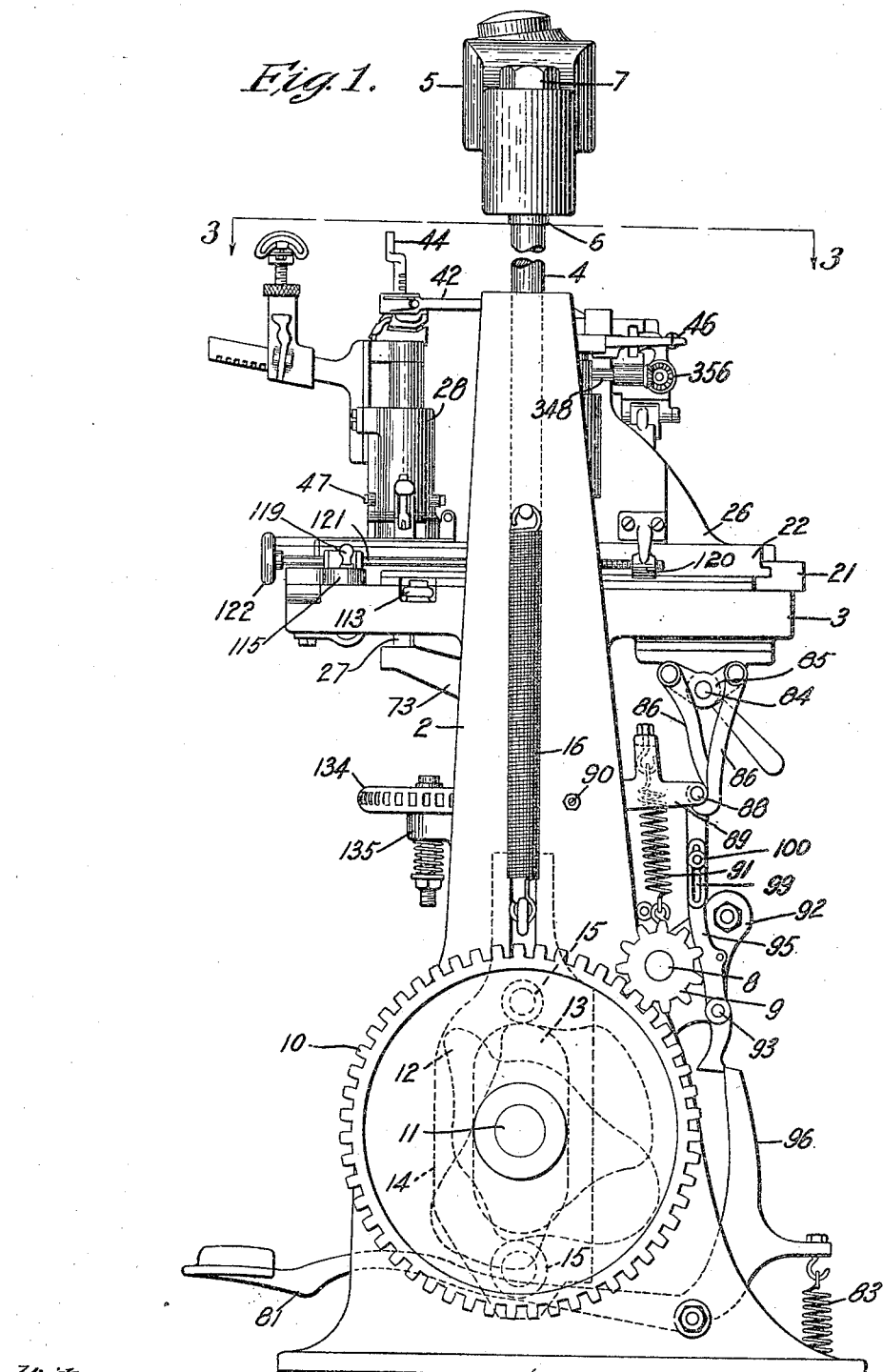
Figure 2:
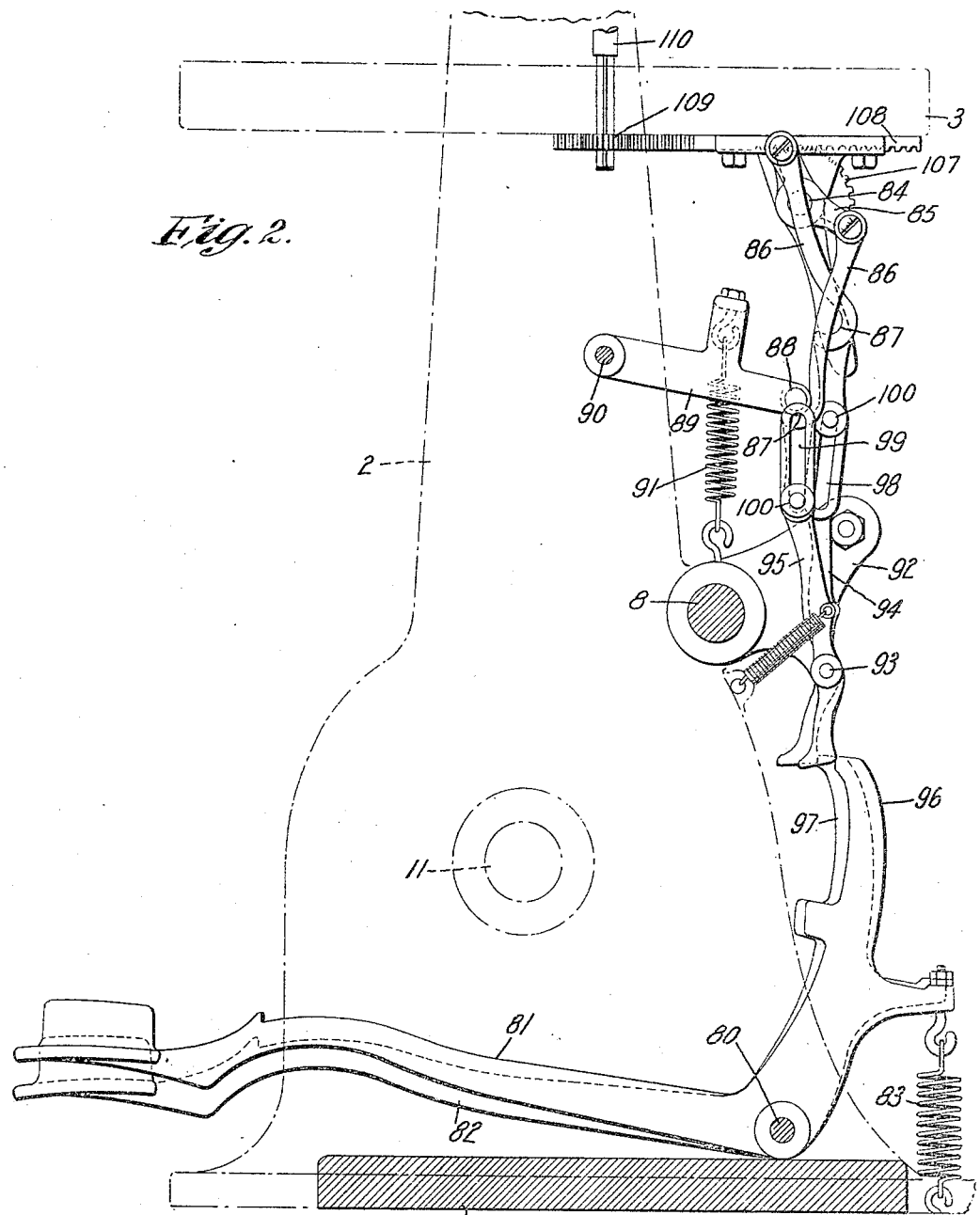
Figure 3:
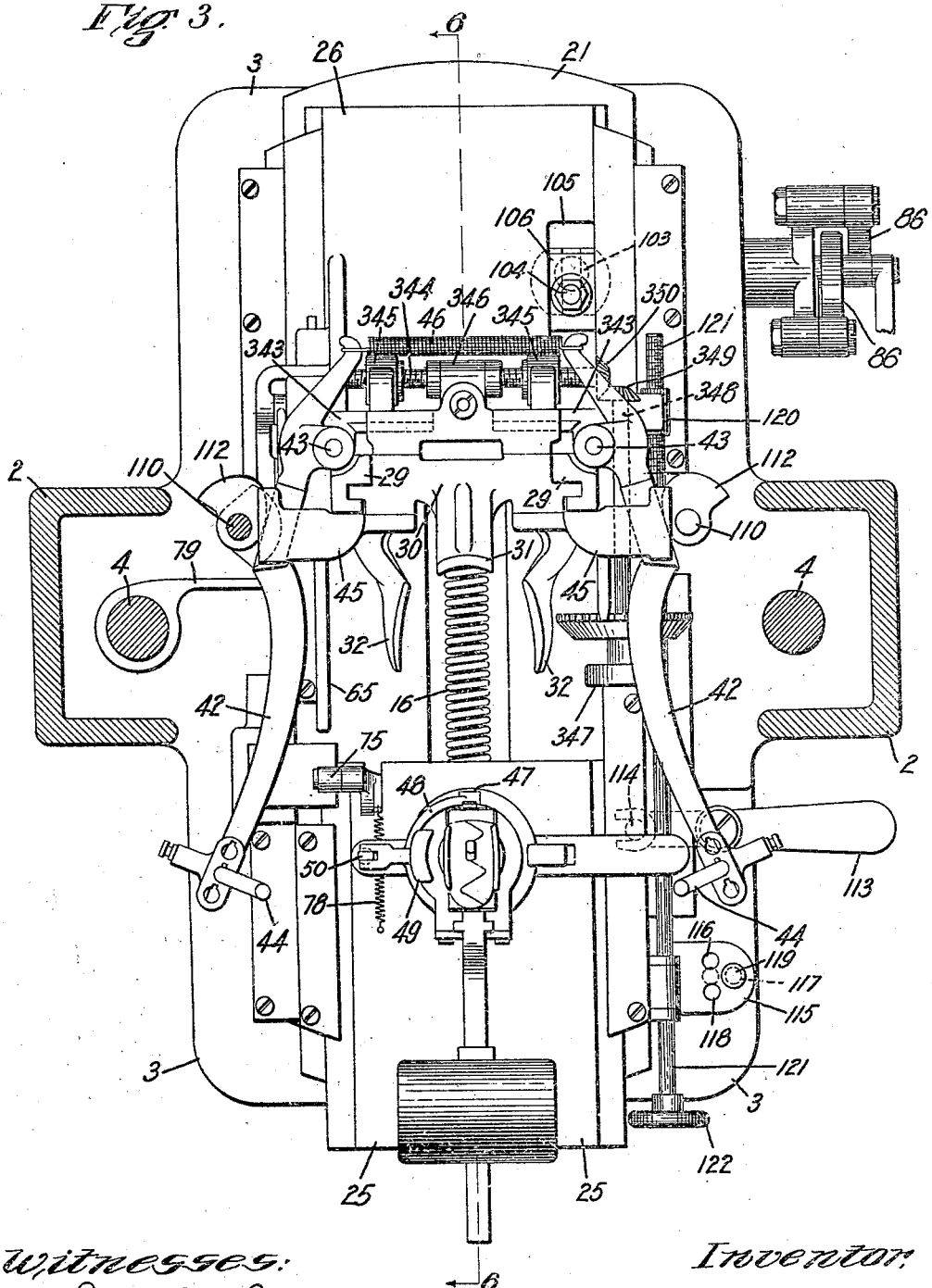
Figure 4:
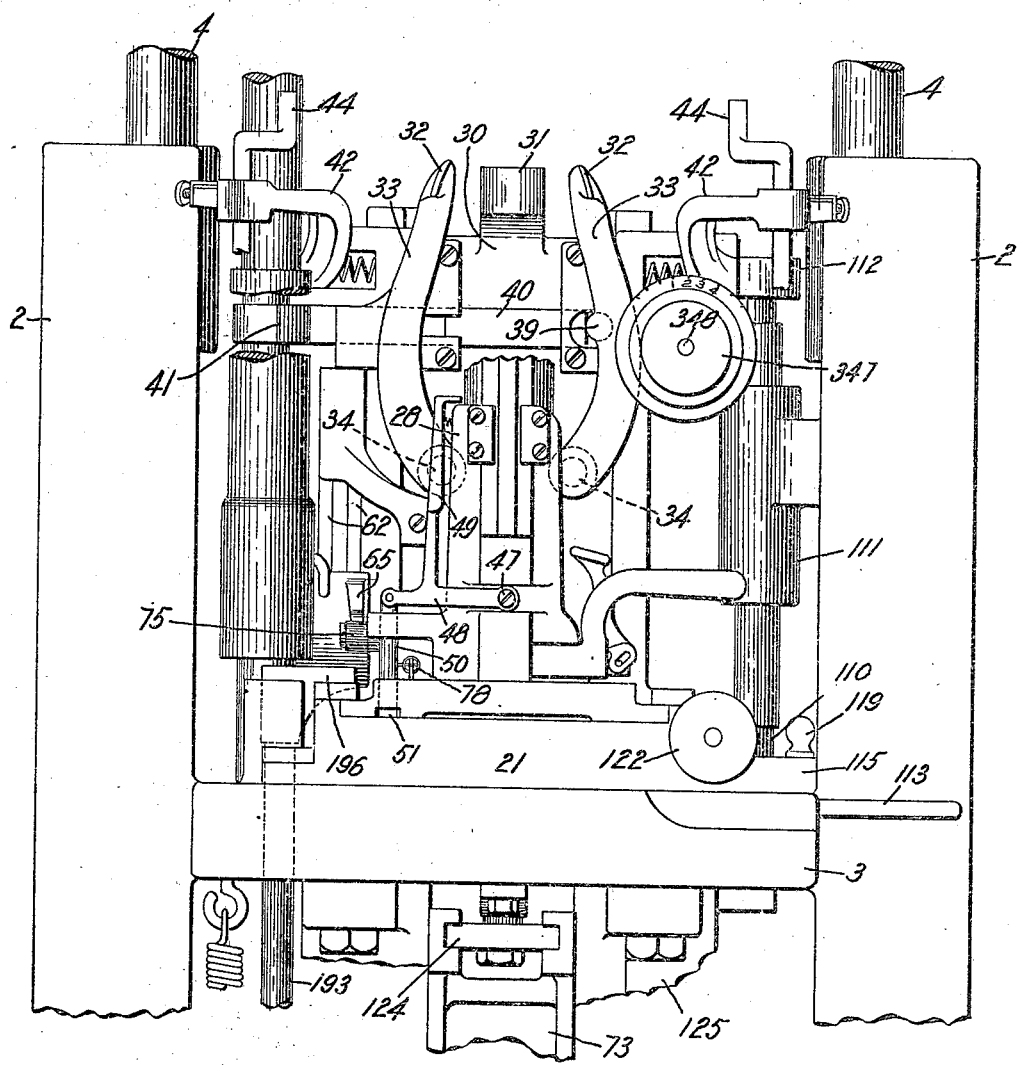
Figure 5:
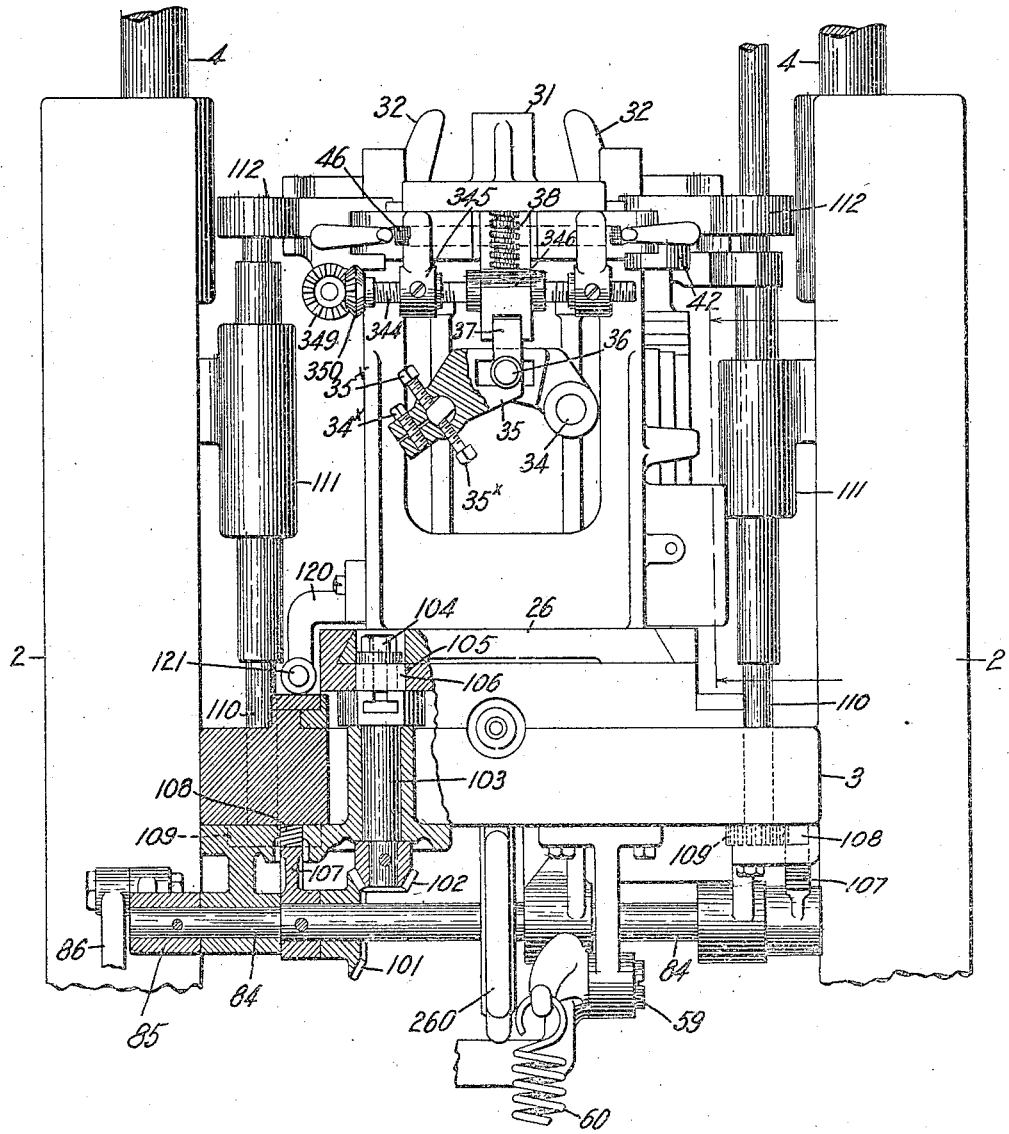
Figure 6:
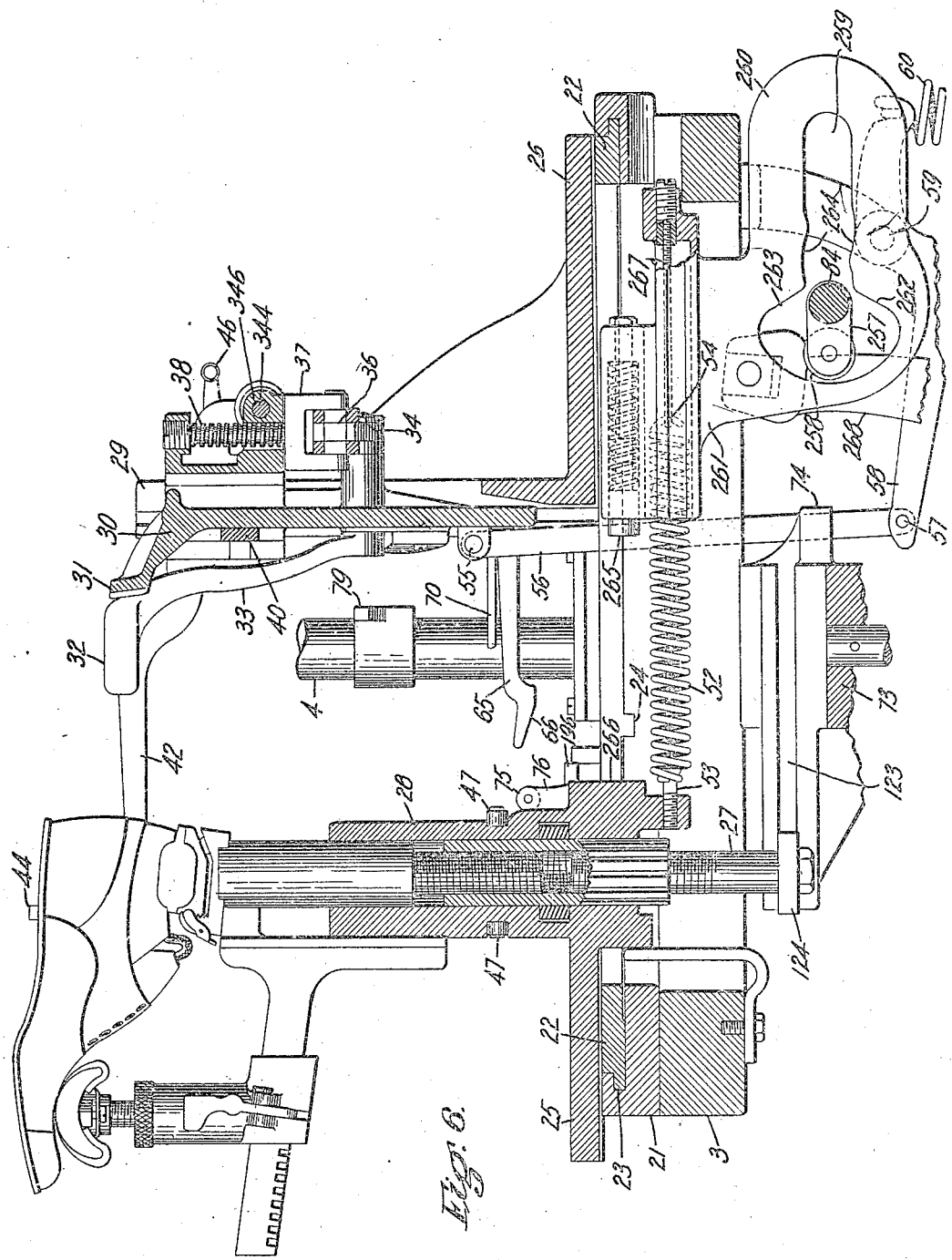
Figure 7:
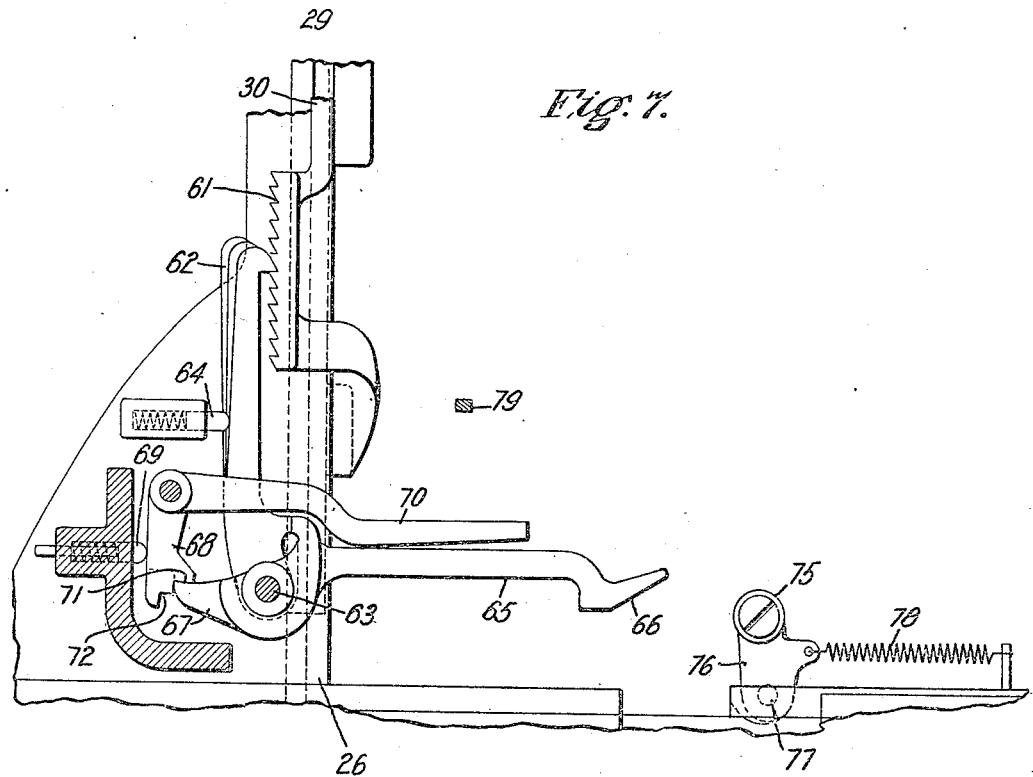

In the drawings: Figure 1 is a side elevation of a machine of the general character mentioned, embodying the present invention, some of the parts being broken away; Fig. 2 is an enlarged side view of the lower part of the machine with the side frame or standard nearest the observer removed, showing more particularly some of the means for actuating the shoe positioning devices; Fig. 3 is a sectional view on the line 3—3, Fig. 1, the parts being shown on an enlarged scale; Fig. 4 is an enlarged front view of the work support and its associated parts; Fig. 5 is an enlarged rear view, similar to Fig. 4, with some of the parts in section and others broken away; Fig. 6 is a section on the line 6—6, Fig. 3, showing the shoe supporting and positioning means; Fig. 7 is a detached detail of part of the shoe positioning means or support; Fig. 8 is a central vertical sectional view of the lower part of the machine on an enlarged scale, showing the heel measuring means; and Fig. 9 is a sectional detail of the rack and pinion or toothed sleeve for measuring the heel and the locking pawls.

The general framework or supporting frame may be of any usual or desired type and is shown as having a base portion 1 and two side uprights 2, 2, connected intermediate the top and bottom thereof by a fixed table or support 3, and furnishing suitable guiding means, as usual, for the actuating rods 4, 4 carrying the cross-head 5, to which the said rods are connected by suitable collars 6 and nuts 7.

Extending transversely between the side frames or uprights 2, 2 is the driving shaft 8, Fig. 1, carrying a gear 9 which is operatively engaged with a gear 10 fast on the counter shaft 11, also extending between the said frames, such gearing connection being as four to one, so that the counter shaft 11 will be driven one complete rotation for four rotations of the driving shaft 8.

Secured to the counter shaft 11 are the pairs of cams 12 and 13, one pair adjacent each side of the machine frame, for reciprocating the rods 4 and consequently moving the cross-head vertically. The connection between the rods 4 and the cams 12 and 13 may be made in any suitable manner, and, as indicated in Fig. 1, such driving connection is formed by means of a yoke 14 connected to the said rods and carrying the rolls 15 adapted to contact with the peripheries of the cams, a spring or springs 16 being provided, if desired, to assist in counterbalancing the cross-head. Preferably the cams 12 and 13 are designed to the end that two complete reciprocations are given the cross-head for each complete rotation of the counter shaft 11, one reciprocation of the cross-head being used for attaching the heel and the second reciprocation for spanking on a toplift to the previously attached heel.

The cross-head 5 may be provided with a nail block and driving devices, as fully shown and described in said application, Ser. No. 478,954, and as such devices are not claimed herein, detail description and illustration thereof are sufficiently set forth by said prior application.

The stationary cross piece or table 3 of the machine frame sustains the shoe jack or support and also the devices for positioning the shoe with relation to the nailing devices carried by the cross-head.

Having reference to Fig. 6, the support 3 carries a sliding table 21 movable in suitable ways in the support 3. On the sliding table 21 is mounted a swinging table 22, Fig. 6, having angular movement in suitable guides 23 and a turning circle 24 transversely of the machine. On the swinging table 22 is mounted the jack slide 25 carrying a suitable jack or shoe supporting element and a second slide 26, Fig. 6, which, for identification, may be known as the positioning slide, said slide supporting the clamping and positioning devices for the shoe. The jack slide and positioning slide have forward and backward movement in suitable guideways on the swinging table, said guideways being well shown in Figs. 3 and 6. The jack may comprise a heel and toe support, as indicated in Fig. 6, provided with desirable adjustments, and the jack as a whole is mounted upon a spindle 27 which has vertical movement in a guiding sleeve 28 rising from the jack slide 25. A shoe with a last still within the upper is mounted, sole up, on this jack preparatory to any movement of the machine parts.

Rising from the positioning slide 26 are the guides 29, Figs. 3 and 6, between which is mounted the slide 30, the upper portion of said slide, as at 31, constituting a back stop to engage the heel portion of the shoe when the jack has been moved to carry the shoe into nailing position, and said slide likewise affording a support for the counter clamps and side gages, as will presently appear. The counter clamps 32 are carried at the upper ends of lever arms 33 fulcrumed by their lower ends upon horizontally arranged pins 34, Figs. 5 and 6. Secured to and extending from each of these pins 34 is a lever arm 35, Fig. 5, which lever arms are provided at their inner ends with crossing slots engaged by a pin 36 in a slide block or yoke 37, Figs. 5 and 6, suitably guided for vertical movement and having an upwardly projecting stem surrounded by a spring 38, the normal tendency of which is to depress the yoke 37, and, as will be evident, throw the counter clamps 32 toward each other or into clamping position.

One of the levers 33, carrying a counter clamp member, has a pin 39, Fig. 4, which engages a slide 40, the end of said slide bearing upon a cam 41, Fig. 4, and held in such engagement by the tension of the spring 38, as will be apparent. Obviously, upon rotation of the cam 41, in a manner to be hereinafter described, the counter clamps will be moved either by said cam or their actuating spring 38 to open and close the counter clamps.

In order that each of the counter clamps 32 may be appropriately adjusted to bring them into proper coöperative relation with a shoe counter, means are provided for individually adjusting them with respect to their operating means. One convenient form of such relative adjustment of the counter clamps is illustrated in Fig. 5, wherein one of the slotted arms 35 is shown as connected to its shaft 34 by means of a clamp screw $34^x$, by loosening which, said arm 35 may be moved rotatively on its shaft in either direction by means such as the adjusting screws $35^x$, and then held in such adjusted position by tightening the clamp screw $34^x$. Obviously various forms of adjusting means may be employed within the true scope of the present invention.

After the shoe has been jacked and has been clamped in the machine between the counter clamps, it is in some position beneath the nail block and driving devices and the operator must determine by his eye or by several trials of the machine whether or not it is in correct alinement with such devices and whether or not the heel is correctly pointed relatively thereto. The swinging table 22 is used to turn the shoe angularly in order that it may be in proper position beneath the heel carried by the heel attaching devices to have the heel point in the desired direction when attached. Heretofore, in angularly adjusting a shoe with relation to the heel by swinging a table on which the shoe jack is mounted, the limit of swing has been determined by adjustable stops on the table. As is well known to those skilled in the art, counter clamps do not hold all shoes of one kind invariably in the same position as there is considerable opportunity for loose play of the shoe between the clamps. Therefore a swinging table alone is unreliable to determine a similar pointing of the heel on a series of shoes, as the heel will be pointed according to the position assumed by the shoe within the counter clamps. It is desirable that some means be provided to aid the angular adjustment of a shoe by means of a swinging table so that each shoe of the same kind invariably reaches the same angular position with relation to the heel before the heel is attached.

With the above ends in view there is mounted upon either side of the movable slide 30 horizontally arranged arms 42, Figs. 3 and 6, which turn about pivots 43 carried by the slide, said arms carrying at their free ends adjustable gages 44. These arms, which for identification may be known as the forepart gage arms, travel in guides 45, Fig. 3, and their rear ends are connected by a spring 46 which normally maintains the gages 44 at the outer ends of their path of movement. When a right shoe is to have the heel attached, the left gage, Fig. 3, is brought to a position so that in moving the shoe angularly by swinging the table 22 to properly point the heel, the operator has a stop against which the inner edge of the sole of the shoe may be brought, thereby correctly determining the position that the shoe should assume in the counter clamps 32. When operating upon a left shoe the right forepart gage will be brought forward for a similar purpose.

Before a shoe is finally placed in position with relation to the heel mechanism it is held at the front of the machine for convenient handling of the shoe, as in Fig. 6, and must be moved backwardly into the machine to gain its heel attaching position between the counter clamps. As one means of thus holding the jack slide 25 in its forward position there is pivoted at 47, Fig. 4, a hand operated lever 48, the upwardly projecting arm 49 of which extends along the sleeve 28 of the jack slide. Secured to the outer end of the lever 48 is a locking pin 50, Fig. 4, the lower end of which normally projects downward into engagement with a tooth 51 carried by the swinging table, the construction being such that when the parts are in position, as indicated in Fig. 4, the jack will be held in its outer position, Fig. 6, but when the upper end of the hand piece 49 is closed toward the sleeve 28 of the jack slide, the pin 50 will be removed from the teeth 51 and permit the spring 52, Fig. 6, to draw the jack slide and jack backwardly to a position determined by the positioning slide 26 and its attached parts, it being understood that one end of the spring 52 is connected as at 53 to the jack slide and its other end is connected as at 54 to a part which insures tension of the spring 52 at the time the jack is to be moved, all of which will more fully hereinafter appear.

As hereinbefore stated the counter clamps and forepart gages are carried by the slide 30 which likewise carries the back stop 31. It is desirable that the slide 30 and its attached parts shall be depressed and held in depressed position at the conclusion of the nailing and toplift applying operations, so that it becomes necessary to raise the slide and its attached parts to a position to contact with the shoe at their respective points of coöperation therewith when the jacked shoe is moved back into position between the counter clamps, as will be understood. Connected to the slide 30 at 55, Fig. 6, is a link 56, the lower end of which is connected at 57 to one arm of a lever 58 pivoted at 59 and normally under the influence of a spring 60, Fig. 6, tending to lift the slide 30. Secured to the slide 30, and as one means of restraining it from response to the demands of the spring 60, is a series of rack teeth 61 adapted to be engaged by one of a series of pawls 62 pivoted at 63 to the positioning slide 26 and normally under the influence of a spring plunger 64, Fig. 7. Projecting from the pivotal point of the pawls 62 at 63 is an actuating arm 65 having a cam end 66, and extending rearward of the pivotal point 63 is a toe 67 adapted to engage a locking dog 68 normally under the influence of a spring plunger 69, said dog 68 having a forwardly extending arm 70. The dog 68 has two shoulders 71 and 72, either one of which may be engaged by the toe 67, and the construction being such that when the toe 67 is in engagement with the shoulder 71, the pawls 62 will be in engagement with the rack teeth 61 and hold the slide 30 from upward movement responsive to the actuating spring 60, Fig. 6, but when the arm 65 is lifted it will detach the toe 67 from the shoulder 71, thereby freeing the pawls 62 from the rack teeth 61 to permit the slide to respond to the demands of its spring 60, and the toe 67 will engage with the shoulder 72 to hold the parts in this position.

Obviously the extent of upward movement of the slide 30, in order to bring the back gage counter clamps and side gages into proper coöperative relation with the shoe upon the jack, should be controlled by the position of the jack itself and to this end the head 73, Fig. 6, of the jack elevating or measuring means, as will presently be described, is provided with a stop 74 in the path of movement of the lever arm 58, so that when the slide has been raised to an extent defined by said stop the parts carried by the slide will be in proper coacting relation as to height with respect to the shoe on the jack.

In order that the arm 65 carrying the pawls 62 may trip said pawls and free the slide as the jack moves the shoe into position between the counter clamps, said jack is provided with a roll or trip 75, Fig. 7, carried on a pivoted finger 76 pivoted at 77 on the jack slide and normally under the influence of a spring 78, a stop being provided to prevent movement of the finger 76 to the right around its pivot under the action of the spring 78, but permitting movement thereof to the left, Fig. 7, as the jack moves back to the initial position, taking the roll 75 from under the arm 65.

In order that, when the slide is depressed at the conclusion of the nailing operation, it may be held so depressed, one of the crosshead actuating rods 4 is provided with a depressing finger 79, Figs. 3 and 6, which is adapted to contact with the arm 70, Figs. 6 and 7, trip the dog 68, and permit the pawls 62 to move into coöperative relation with the rack teeth 61, the parts at the conclusion of the operation described being as indicated in Fig. 6.

The jacked shoe having been moved backward between the counter clamps and forepart gages, and the slide 30 with its counter clamps and forepart gages having been raised to the position dictated by the position of the jack, the swinging table 22, the forepart gage carrying arms 42 and the counter clamps are to be operated to position and hold the shoe with respect to the nailing devices. The means for effecting these movements may be briefly set forth as follows.

Pivotally mounted at 80, Fig. 2, are the two treadle levers 81 and 82 each normally under the influence of a spring 83 tending to keep the foot end of the said treadle levers in raised position, as will be evident from Fig. 2. Suitably supported in brackets depending from the under side of the table or fixed support 3, Figs. 1, 2 and 5, is a rock shaft 84, the purpose of which is to effect swinging movement of the shoe support or swinging table to the right or left, according to the character of shoe being treated, to likewise swing one of the forepart gage arms 42 into operative position, and to effect closing movement of the counter clamps.

Secured to the rock shaft 84 is the yoke 85 having connected at each end thereof a link 86 provided with a rounded seat 87 in which is adapted to be received a pin 88 carried on the free end of a lever 89 pivoted at 90 to the machine frame standard and normally under the influence of a spring 91 acting to depress the pin 88. Obviously when the pin 88 is in engagement with both of the rounded seats 87 on the two links 86, 86, as indicated in Fig. 1, the rock shaft 84 will be held in the position indicated in Fig. 1, but if either of said hooked seats 87 is thrown from beneath the pin 88, then the tension of the spring 91 acting through the pin 88 on the other link 86 will rock the rock shaft 84, as indicated in Fig. 2. In order to effect this adjustment, and consequently the rocking movement of the shaft 84 either to the right or left, there is pivoted to a suitable bracket 92, Fig. 2, as at 93, the trip levers 94, 95, the lower ends of which are in the path of movement of the upper horn shaped end 96, 97, of the treadle levers 81, 82, respectively, and the upper portions of the trip levers 94, 95 are slotted at 98, 99 for the reception of suitable pins or rolls 100 carried by the links 86 below the hooked seats 87 thereof, the construction being such that upon depression of either one of the treadles 81, 82, one of the trip levers 94, 95 corresponding thereto will be moved on its fulcrum 93 and the seat 87 of the link 86 connected thereto will be moved from beneath the pin 88 so that the shaft 84 will be rocked in one direction or the other according to the desired adjustment to be given to the swinging table and the other parts referred to.

Mounted on the rock shaft 84, Fig. 5, is a pinion 101 in engagement with a like pinion 102 on a short shaft 103 extending upward through the fixed table or support 3, the upper end of said shaft 103 carrying an eccentrically mounted and adjustable pin 104. As indicated in Figs. 3 and 5, the swinging table has a slot 105 in which is mounted to slide a block 106 carried by the eccentrically mounted pin 104, the construction being such that upon rotation of the shaft 103 to the right or left the eccentrically mounted pin 104 through the block 106 will swing the table 22 to the right or left.

As one means of moving the forepart gages so as to throw one or the other into coöperative relation with the shoe and define its position with respect to the heel nailing mechanism, as hereinbefore described, the said rock shaft 84 is provided with segments 107, each adapted to engage a longitudinally sliding rack bar 108, Fig. 5, carried by suitable guideways of the stationary table 3. The rack bars 108 each engage a suitable pinion 109 mounted, one on each of the upright shafts 110, Figs. 3 and 5, said shafts being properly guided by bearings 111 projecting from the side framing of the machine. The shafts 110 each carry a cam 112 adapted to bear on the outer face of the forepart gage arms 42, the construction being such that upon rotation of the shafts 110 through the rock shaft 84 one or the other of these forepart gage arms will be moved into coöperative relation with the shoe to position its forepart gage 44, and since these shafts 110 rotate in the same direction, as will be understood, one of the cams 112 will move its gage arm into gaging position while the concentric operation of the other cam allows the other arm to remain at rest.

As hereinbefore described, one of the counter clamps has a pin 39, Fig. 4, engaging a slide 40 which is held in contact with the cam 41 on one of the shafts 110, so that upon rotative movement of said shafts 110 the counter clamps will be moved either by the cam 41 to separate such clamps or to permit the spring 38 to move the counter clamps into clamping position upon the shoe.

It is obvious with varying sizes or styles of shoes, that the position to which it is desired to bring either forepart gage will vary. For the smaller sizes and for narrow shoes, their operative positions should be well toward the center, while for larger sizes and greater widths their positions should be farther from the center. Because the throw of the cams 112 is constant, the length of the movement of the gages 44 will be constant, but by changing the path of their movement the operative positions may be readily varied. The path of movement of the forepart gages is preferably changed by mounting the pivots 43 of the supporting arms 42 in sliding blocks 343, Fig. 3, which are screw-threaded upon a right and left screw rod 344 by means of the lugs 345, said rod being supported from endwise movement in a block 346, Fig. 3, carried by the slide 30. The rod 344 is operated to move the blocks 343, by means of the hand wheel 347, Fig. 3, on the shaft 348, which is operatively connected to the rod 344 by the bevel gears 349 and 350, as will be readily apparent from Fig. 3.

In operating upon shoes in which the wooden last is still retained, it is necessary, as is well known by those skilled in the art, to measure the heel in order that the wooden last will not be broken by applying too much pressure. This measuring operation, in the illustrated embodiment of the invention, is preferably performed before the automatic operation of the machine in attaching the heel and toplift. Before describing the preferred construction of measuring mechanism, it is convenient to describe the various positions in which it may be desirable to place a heel with relation to the shoe, and the means contemplated by the present invention for effecting such varying relationship.

When the toplift carrier is brought into position beneath the nail block, the toplift sustained thereby should be in such position with relation to the heel seat of the shoe that when the heel is trimmed by using the toplift as a guide, as is customary, the desired appearance of the heel with relation to the shoe will be secured. If a right or left appearance of the heel is not required, it is desirable that when the shoe is viewed from the rear the planes formed by the lateral surface of the heel between the toplift and the outer sole, upon either side of the shoe, extend at the same angle to the tread face of the toplift. Such an alinement of the heel will give the shoe the trim appearance desired. It is obvious that this alinement will be obtained if the toplift be secured to the heel in such position that the center of its back is in vertical alinement with the heel seam which in turn is at the center of the back of the heel seat of the shoe. On the other hand, if the center of the back of the top lift is not centrally arranged with relation to the back of the heel seat of the shoe, when the heel is trimmed with relation to a toplift so placed, the lateral surface of the heel at one side will extend at a greater angle to the face of the toplift than the lateral surface at the other side. If it be assumed that a toplift has been correctly alined, as just described, above the heel seat of the shoe which has been placed square with a series of nail holes in the driver block, it is obvious that if such shoe be then adjusted for pointing the heel by turning the shoe angularly about a center somewhere within the perimeter of the toplift, it will throw the center of the back of the heel seat of the shoe to one side or the other of the center of the back of the toplift. Under these conditions the desired square appearance of a finished heel will not be obtained even though the angular adjustment for pointing has been correctly made. Such a condition may be remedied by placing the pivot on which the shoe is turned substantially vertically in line with the center of the back of the toplift instead of within its perimeter. This point is chosen because all toplifts, of whatever size, when secured to a heel, overlap substantially the same distance beyond the rearmost nail, therefore it will not be necessary to change a center so selected in changing the size of the toplift. The distance of the center of the back of the toplift forward of the center of the back of the heel seat is so slight that for all practical purposes a turning center chosen as described will give the same results as if it were in fact in vertical alinement with the center of the back of the heel seat.

In adjusting a shoe, whether right or left, for a desired pointing of the heel, the shoe is swung in the direction of its inner side. Under this condition it is obvious that if the shoe be swung about an axis beyond the center of the back of the stationary toplift, the center of the back of the heel seat of the shoe will be moved to a position on the inner side, with relation to the shoe, of the center of the back of the toplift. If, however, the shoe be swung in the direction named about an axis in front of the center of the back of the stationary toplift (as, for instance, within the perimeter of the toplift), the center of the back of the heel seat of the shoe will be moved to a position on the outer side, with relation to the shoe, of the center of the back of the toplift. The heel when trimmed will then have a right or left appearance on the shoe according to the position of the axis about which the shoe is swung.

A brief description will now be given of one means for adjusting the axis about which the swinging table 22 moves so that the shoe may be properly positioned beneath the stationary toplift when the toplift carrier is brought into position beneath the nail block.

As hereinbefore noted, the swinging table 22 is carried by the sliding table 21 which has movement in and out of the machine with reference to the cross-head or nailing devices, therefore any movement of the sliding table 21 in a direction transverse to the cross-head will move the pivotal point of the swinging table relatively to the toplift held in position beneath the nail block of the cross-head. Before any work is performed upon the machine the sliding table 21 should be adjusted with relation to the cross-head in such manner that the pivotal point of the swinging table 22 is in the desired relation to the center of the back of the toplift when the toplift is in spanking position. This may be accomplished by any suitable means as, for instance, the hand lever 113, Fig. 3, pivoted on the fixed table or support 3 and engaging at its inner end a pin 114 on the sliding table 21. The sliding table 21 is provided with a projection or holding lug 115, Fig. 3, having holes 116, 117 and 118 through which a pin 119 is adapted to be passed to register any one of the holes in the lug 115 with a hole beneath the series in the supporting or stationary table 3. When the sliding table 21 is thus adjusted it is locked in adjusted position, and should the pin 119 be passed through the hole 117 in the lug 115 into a hole directly beneath, as shown in Fig. 3, the axis about which the table 22 swings will be in vertical alinement with the center of the back of a toplift correctly positioned with relation to the nail holes in the nail block. When the forward or the rear hole is thus in register with the hole beneath, and the table 21 secured in such position by the pin 119, the axis named is beyond or forward, respectively, of the center of the back of the toplift. Means is thus provided for preliminarily adjusting the axis of the swinging table to give a square or a right or left appearance to the heel when trimmed. When operating upon heels of varying pitch, the selected position of the axis of the swinging table 22 should remain unaltered, the proper adjustment being obtained by movement of the shoe relatively to the toplift when in spanking position on the cross-head. Therefore the positioning slide 26, Figs. 3 and 6, which supports the back gage and counter clamps is connected by a threaded lug 120, Fig. 3, to an adjusting rod 121 having an operating hand wheel 122, Fig. 3, and suitably mounted for adjusting the positioning slide 26 forward and backward upon the swinging table 22 with relation to its axis of movement. Obviously after the shoe has been jacked and the shaft moved backward between the counter clamps, and the counter clamps closed upon the shoe, adjustment of the positioning slide 26 will also carry with it the jack slide 25 supporting the jack, and the position of the heel seat of the shoe, with relation to the toplift, may thus conveniently be adjusted. It will be noted, however, that in either of the adjustments just referred to the axis of the swinging table 22 with relation to the toplift remains unchanged, therefore when the swinging table is turned about its center of rotation, carrying the shoe with it, neither of these adjustments will effect the desired appearance of the heel when trimmed. The shoe having been jacked, as described, and positioned in the counter clamps and by the forepart gages, is next to be measured, that is, the shoe support is to be raised into such position with respect to the heel attaching mechanism as to give the proper compression to the heel and effect the desired attachment.
The heel measuring mechanism and its operative connections and adjuncts are best shown by Fig. 8. The jack spindle 27, Fig. 8, is supported for movement toward and from heel attaching position in the block 73, Fig. 8, said block being provided with suitable guideways 123 for the lower end 124 of the jack spindle 27. The measuring spindle extends downward and within a frame 125, Fig. 8, depending from the stationary table or support 3, and is preferably formed of two pairs of right and left hand screws, each of which pairs are connected by a toothed sleeve in the form of an elongated pinion. Each pair of screws with its connecting sleeve forms a turn-buckle. The upper pair 126 and 127 of right and left screws are connected by a sleeve 128, while the lower pair of right and left screws 129 and 130, Fig. 8, are connected by a sleeve
131. The screws 127 and 129 are held from rotation by a collar 132 pinned thereto and moving in suitable guides in the frame 125. Thus all the screws combine to form substantially a single spindle which, however, is capable of longitudinal adjustment. The lower screw 130 is fixed to a support hereinafter described. The upper screw 126 is pinned to the head 73 which supports the jack spindle 27. The head 73 is mounted for vertical movement in suitable guideways 133, Fig. 8, so that any vertical adjusting movement of the measuring spindle by the right and left screws and their operating means will be communicated to the jack spindle, as will be obvious. The upper pair of screws are of such pitch that on turning the sleeve 128 an easy and quick adjustment may be obtained, and in order to obtain such adjustment there is provided a hand wheel 134 mounted in the bracket 135, Fig. 8, and provided with a series of peripheral teeth 136 adapted to engage complemental teeth in the upper sleeve 128. Obviously by means of the hand wheel 134 the operator may initially rotate the sleeve 128 and thereby lift the jack spindle and with it the jack to any desired height with relation to the heel supported in the nail block. Of course the counter clamps should move vertically with the shoe so as to retain the proper relationship between them and the work, such movement being permitted to the counter clamps, or forepart gages and slide carrying such parts, by reason of the stop 74 on the head 73 moving upward and permitting the spring 60, Fig. 6, to move the slide upward, as will be clear. Thus the jack with its shoe, the counter clamps and the forepart gages all may rise simultaneously when the sleeve 128 is rotated by means of the hand wheel 134. This adjustment by means of the hand wheel 134 and its connections is preferably formed before either of the treadles 81, 82 is depressed. After the shoe has been placed upon the jack and has been clamped and adjusted in position, as heretofore described, it is raised until it meets and measures the heel supported by the nail block by mechanism actuated by either of the treadles 81, 82. To this end a rack 137, Fig. 9, is mounted in the frame 125 in position to mesh with the sleeve 131, whereby reciprocation of the rack will rotate the sleeve and will separate the right and left screws 129, 130 to elevate the block 73 and therethrough elevate the jack and shoe.

The rack 137 may be operated by any desired means, and is preferably actuated by the means fully set forth and described in the prior application mentioned to which reference may be had.

In order to hold the rack and perforce the sleeve 131 in position to which they have been moved, as stated in said application, a series of locking slides 151, Figs. 8 and 9, are employed and pivotally mounted on a bracket 153, Fig. 8, is a locking pin withdrawing arm 154. Pivotally mounted on a bracket 155 is an actuating arm 156 carrying a roll 157 adapted to engage and be actuated by a cam, as described in said application, for withdrawing the locking pins from locking position.

From the construction thus far described it will be seen that the shoe having been placed upon the jack and the jack moved back into position beneath the nailing devices, the counter clamps and forepart gages are raised into position determined by the jack, and above the shoe support carried by the swinging table, and the forepart gages are swung to the right or left by an appropriate treadle, and the counter clamps are moved into clamping position with relation to the shoe. By the means also described, the jacked shoe has been adjusted by hand and then the heel measured by the rack bar. All these movements have been under the control of the operator either by hand or treadle manipulating means. The shoe being now in proper position with respect to the nailing devices, the automatic operations of the machine are now in order to the end that a heel, loaded or otherwise, may be attached to the heel seat and a toplift properly spanked thereon.

As is well known by those skilled in the art it is desirable and customary in attaching heels to compress the heels either before or during the driving of the attaching nails. This is accomplished by a downward movement of the cross-head 5 in connection with the mechanism to be described. It is also desirable that, during the compression of the heel and the operation of the heel attaching devices, not only the rack bar 137 of the measuring mechanism be locked from movement so that the various screws forming the spindle of the measuring mechanism may act as a unitary support, as hereinbefore described, but it is also desirable that the jack slide be locked from accidental or unintentional movement.

To effect the locking of the jack slide there is mounted at 188, Fig. 8, a lever, one arm 189 of which carries a roll 190 resting upon a cam 191 on the driving shaft 8. The other arm 192 of this lever, Fig. 8, is connected to the lower end of a locking rod 193, said rod 193 preferably passing through the arm 192 of this lever, and provided with a spring 194 interposed between the lower surface of said arm and proper adjusting nuts 195, whereby the action of the lever upon the locking rod will, to an extent, be a yielding one. The upper portion of the locking rod 193 extends through the stationary table or support 3 and carries a locking head 196, Fig. 4, which upon depression of the locking rod 193 is brought into locking engagement with the jack slide, thereby holding the parts in adjusted position.

It is obvious that in the measuring operation unless the screw 130, Fig. 8, is held from downward movement, the rotation of the sleeve 131 will impart equal but opposite movements to both of the screws 129 and 130. If, however, the screw 130 is held from downward movement, the rotation of the sleeve 131 will act to move the upper screw through twice the distance before obtainable. In order to maintain the screw 130 stationary during the measuring operation, the support 197 which sustains the screws forming the measuring spindle is normally locked against downward movement during the action of the measuring rack 137. The support 197 is slotted, as shown in Fig. 8, to embrace the counter-shaft 11. The locking of the spindle is accomplished by means of a bell crank lever 198, Fig. 8, pivoted upon the frame 125 at 199, said lever 198 carrying a pin and roller 200, Fig. 8, adapted to engage beneath the lug 201 projecting from the support 197. The upper arm 202 of the lever 198 is provided with a roller 203 engaging a cam 204, Fig. 8, conveniently formed upon the gear 205, as pointed out by the said prior application. A spring 209 is arranged to normally maintain the roller 203 in contact with its cam. Thus the measuring spindle support 197 is held against downward movement during the measuring operation, when said measuring is performed by actuation either of the hand wheel 134 or by the rack 137.

The downward movement of the cross-head 5 to compress the heel is through a fixed distance determined by the general character and design of the cross-head operating cams 12 and 13. Just prior to the descent of the cross-head, the cam 204 operates to move the roller 200 of the lever 198 out from beneath the lug or projection 201 on the measuring spindle support 197, so that as the cross-head descends it carries the jack and its supported shoe downward before it by depression of the jack spindle 27, the measuring spindle and the measuring spindle support. These parts are sustained when the roller 200 is removed from beneath its lug or projection 201 by means of a strong leaf spring 210, Fig. 8, bearing upwardly against the lower end of the measuring spindle support 197. This spring retreats before the downwardly moving parts as the cross-head descends. The amount of compression to be placed upon the heel is determined by an adjusting device carried by the measuring spindle support 197, coöperating with a fixed or stationary abutment, as will now be described.

The lower end of the spindle support 197 is threaded, Fig. 8, and mounted on such threaded portion is a collared sleeve 211, Fig. 8, which may be adjusted longitudinally of the support by turning said interiorly threaded sleeve on the screw-threaded portion of the spindle support, and then locked in desired position by a latch 212 engaging one of a series of teeth 213 on the collared portion of said sleeve. The sleeve 211 moves in a guide 214 rising from the base of the machine frame, Fig. 8. If, now, the distance between the upper surface of the guide 214 and the under surface of the collar 213 of the sleeve 211 is equal to the vertical movement of the cross-head there will of course be no compression of the heel. If, however, this distance is less than the vertical movement of the cross-head, the heel will be compressed an amount equal to the difference between this distance and the movement of the cross-head. Before the machine is started, therefore, the sleeve 211 is adjusted to bring its collar 213 the correct distance from the top of the guide 214 for the amount of compression desired to be placed upon the kind of heel which is to be treated. The first operation, then, after the machine is started on its automatic movement, is to move the cross-head, jack and measuring spindle downward until the collar on the sleeve meets the top of the guide 214 when the shoe will be held against further downward movement and the succeeding downward movement of the cross-head will serve to compress the heel the desired amount. In order that the shoe may not follow the cross-head upward, the lever 198, Fig. 8, has a roll 248, Fig. 8, at its lower end which, when the spindle support 197 is in its lowered position, as hereinbefore described, will engage above the projecting lug 201 of said spindle and hold the parts in lowered position against the action of the spring 210 which normally tends to raise the support, until the roll 248 is removed from above the lug 201. After the toplift has been secured to the heel, as pointed out in said prior application, the parts should all be returned to their initial positions for receiving a new shoe, and it is convenient to automatically move the jack forward from the counter clamps into shoe removing and receiving position. One form of preferred mechanism used to accomplish these objects will now be described.

Having reference to Figs. 5 and 6, the rock shaft 84, through which the swinging shoe support or table was moved laterally to the right or left, and the forepart gages likewise positioned, and the counter clamps controlled as to their operative relation with the shoe, has secured thereon, Fig. 6, an arm 257 provided with a roll 258, said shaft 84, arm 257 and roll 258 being embraced by a recess 259 in a link 260 secured to or forming part of a bunter carriage 261, Fig. 6. The slot 259 in the link 260 is so formed that when the bunter carriage and link 260 are in their back position, as illustrated in Fig. 6, the shaft 84 can be rocked so as to carry the arm 257 upward or downward, and when the link 260 is moved forward it is evident that the roll 258 will be engaged by the wall 262 or 263 according as the rock shaft has been positioned for a right or left shoe adjustment, and said rock shaft will be turned into its central position to thereby swing the shoe supporting table back to initial position, return the forepart gages to their central or initial position, and to unclamp the counter clamps. In order that these correct positions shall be taken by the parts mentioned, even though some back lash or lost motion may be present, the slot 259 on the link 260 is preferably waved or made somewhat irregular as at 264 so that as the roll 258 passes into the linked part of the slot 259 the swinging table, the forepart gages and the counter clamps will be given a slight extra movement.

The bunter carriage 261 carries a spring actuated bunter 265, Fig. 6, which is adapted to engage a lug 266 extending from the jack supporting slide 25 when said bunter carriage is moved forward. It will be noted that the spring 52 acting upon the jack slide and tending normally to pull the same into position beneath the nailing devices has its end 54 attached to a rod 267, Fig. 6, secured to the bunter carriage, so that as the bunter carriage moves forward and pushes the jack slide into shoe receiving and removing position, said spring 52 is slackened. Movement is imparted to the bunter carriage 261 by means of a lever 268, suitably connected to the bunter carriage at its upper end and pivoted at 269, Fig. 8, the depending end 270 of said lever 268 carrying a roll 271 for engaging a cam groove 272 carried by the cam 273.

When the cross-head 5 begins its up stroke, after the toplift has been secured to the heel, the lever 156, Fig. 8, is actuated to withdraw the locking pawls or fingers 151 from engagement with the measuring rack 137, so that said rack becomes free to return to original position. The cam 204, Fig. 8, about this time acts upon the lever 198 and moves it to unlock the measuring spindle support 197 so that it may move upward under the influence of the spring 210. The bunter carriage lever 268 is also moved at this time by its actuating cam to start the bunter carriage forward slightly, thereby turning the arm 257, Fig. 6, either upward or downward, which rotates the rock shaft 84 in a direction to withdraw the counter clamps and forepart gage from their engagement with the shoe and to move the shoe support back to its center position. The withdrawal of the counter clamps is not accomplished, however, until after the cross-head has ascended a slight distance away from the toplift to prevent the upwardly moving head drawing the shoe upward with it by suction on the heel. At the time the measuring rack locking pawls or pins are released by the actuating cam, the lock or clamp 196, Fig. 4, for the jack support slide is also unclamped so that further forward movement of the bunter carriage will act upon the now entirely free jack supporting slide and push it forward from between the heel clamps, and the cam 204 operates to move the lever 198 to a position to prevent downward movement of the jack spindle support 197, thus holding it in readiness for the next measuring operation, and just before the machine comes to rest the bunter carriage is returned to its initial position, as shown in Fig. 6.

The foregoing description has been made in connection with attaching heels to shoes supported upon a wooden last. It is sometimes desirable to remove the last from the shoe and place the shoe upon an iron anvil, and after the heel has been attached, relast the shoe for the trimming and finishing operations. When an iron anvil is used, as is well known by those skilled in the art, it is not necessary to measure the heel as such anvil is strong enough to sustain whatever added pressure may be placed upon the heel due to variations in height. Therefore when the present machine is used for nailing upon an iron anvil, to make the desired disconnection of the measuring devices it is only necessary to remove the jack supporting slide and the jack spindle 27 and put in the machine in place thereof a slide having upon it an iron anvil with the usual means for adjusting said anvil vertically with relation to its support to obtain the desired amount of compression, such, for instance, as shown in the United States patent to Raymond, 354,655, dated December 21, 1886. It may be noted also in this connection that as the variation in the thickness of soles is very slight the counter clamps may be maintained, if desired, in one invariable position with relation to the top surface of the anvil. The operation of the machine when using an iron anvil is similar in all respects when using a jack for supporting a shoe upon a wooden last with the exception of the functions ascribed to the measuring instrumentalities, which in the former case are inactive.

When the machine is at rest before commencing the series of operations heretofore described, the cross-head is at its vertical position somewhat lower than the greatest height to which it is moved, and the jack slide actuating spring is under tension with the jack at the front of the machine and the swinging table or work support is at its central position and the shoe holding and gaging devices are in inoperative position. A shoe is placed on the jack spindle by the attendant, the lock 49 for holding the jack in its forward position is released and the jack moves back between the counter clamps in response to the spring 52. If not previously adjusted the positioning slide is adjusted through the hand lever 113 for the desired pitch of the heel, the vertical position of the counter clamps and forepart gages, as well as the relation of the axis of the swinging table to the rear of the toplift, is adjusted by the means hereinbefore noted, this and other adjustments of the shoe support bringing the parts into relation for treatment of the shoe. Before the treadle 82 is depressed, the hand wheel 134 is moved in the proper direction to place the heel seat of the shoe such a distance below the heel that, in measuring, the jack spindle is elevated approximately one inch or a little more, the connecting parts being so proportioned that this amount of elevation is obtained through an easy and natural depression of the treadle. The left treadle 82, for instance, is now depressed and through the connections described the swinging table 22 is turned about its axis in a direction to move the forepart of the shoe to the left and the left forepart gage toward the center of the machine, the operator, as the shoe swings, pressing it toward the left to meet the forepart gage. During the latter part of this treadle depression the counter clamps are closed, the measuring mechanism actuating lever 138 is unlocked and the heel is measured. After the heel and toplift have been attached, the parts return to initial position, as hereinbefore described.

What is claimed is:

1. In a machine of the class described, the combination with a shoe support to swing the shoe laterally into a fixed position for treatment, and means including a rock shaft and eccentric pin and slot connection between the rock shaft and shoe support for oscillating said support, of a stop against which the forepart of the shoe contacts to define its lateral position as the shoe support is swung laterally.

2. In a machine of the class described, the combination with a shoe support to swing the shoe laterally into a fixed position for treatment, and means including a spring actuated rock shaft and eccentric pin and slot connection between the rock shaft and shoe support for oscillating said support, of a stop against which the forepart of the shoe contacts to define its lateral position as the shoe support is swung laterally.

3. In a machine of the character described, the combination with a shoe support to swing the shoe laterally into a fixed position for treatment, and spring actuated means for oscillating said support, of a stop against which the forepart of the shoe contacts to define its lateral position as the shoe support is swung laterally.

4. In a machine of the character described, the combination with a shoe support to swing the shoe laterally into a fixed position for treatment, and spring actuated means for oscillating said support, of devices for freeing said means to the action of the spring to cause lateral movement of the support.

5. In a machine of the character described, the combination, with a shoe support, of means for angularly positioning both right and left shoes including forepart gages on opposite sides of said shoe support, and spring actuated means for alternatively operating said gages to determine the swing for rights and lefts.

6. In a machine of the character described, the combination, with a shoe support, of counter clamps, two forepart gages normally in inoperative position, and means acting yieldingly for moving said gages singly into operative position.

7. In a machine of the character described, the combination, with a shoe support, of counter clamps, two forepart gages normally in inoperative position, and means acting yieldingly for moving said gages singly into operative position and permitting the counter clamps to close upon the shoe.

8. In a machine of the character described, the combination of a shoe support to swing the shoe laterally into position for treatment, a rock shaft for swinging said support, means acting normally to maintain the rock shaft in position with the shoe support central of the machine, and devices for selectively causing said means to act upon either side of the rock shaft to cause it to rock in either direction.

9. In a machine of the character described, the combination of a shoe support to swing the shoe laterally into position for treatment, a rock shaft for swinging said support, spring operated means acting normally to maintain the rock shaft in position with the shoe support central of the machine, and devices for selectively causing said means to act upon either side of the rock shaft to cause it to rock in either direction.

10. In a machine of the character described, the combination, with a shoe support and side gages for positioning a shoe, of a rock shaft for swinging said shoe support and one of said side gages laterally, means acting on said rock shaft to normally maintain it in position with the shoe support central of the machine, and devices for causing said means to act more effectively on one side of the shaft than the other to cause it to rock and move the shoe support and one of the gages laterally.

11. In a machine of the character described, the combination, with a shoe support and side gages for positioning a shoe, of a rock shaft for swinging said shoe support and one of said side gages laterally, means acting on said rock shaft to normally maintain it in position with the shoe support central of the machine, and treadle controlled devices for causing said means to act more effectively on one side of the shaft than the other to cause it to rock and move the shoe support and one of the gages laterally.

12. In a machine of the character described, the combination of a work support to swing the shoe laterally into treating position, a rock shaft, treadle controlled means for operating said rock shaft, and a shaft operated from said rock shaft and carrying an eccentric portion for swinging the work support laterally.

13. In a machine of the character described, the combination of a work support to swing the shoe laterally into treating position, a rock shaft, treadle controlled means for operating said rock shaft, a shaft operated from said rock shaft and carrying an eccentric portion for swinging the work support laterally, and means for adjusting the swinging effect of the eccentric portion.

14. In a machine of the character described, the combination of a work support to swing the shoe laterally into position for treatment, a rock shaft for swinging the shoe support, a yoke for rocking the rock shaft, an arm connected to the yoke at each side of the rock shaft, and means acting through said arms for rocking the rock shaft and imparting lateral swing to the shoe support.

15. In a machine of the character described, the combination of a work support to swing the shoe laterally into position for treatment, a rock shaft for swinging the shoe support, a yoke for rocking the rock shaft, an arm connected to the yoke at each side of the rock shaft, means acting through said arms for rocking the rock shaft and imparting lateral swing to the shoe support, and treadle means for controlling the action of said first named means.

16. In a machine of the character described, the combination of a work support to swing the shoe laterally into position for treatment, a rock shaft for swinging the shoe support, a yoke for rocking the rock shaft, an arm connected to the yoke at each side of the rock shaft, and spring actuated means acting through said arms for rocking the rock shaft and imparting lateral swing to the shoe support.

17. In a machine of the character described, the combination of a work support to swing the shoe laterally into position for treatment, a rock shaft for swinging the shoe support, a yoke for rocking the rock shaft, an arm connected to the yoke at each side of the rock shaft, and unitary means acting through either of said arms for rocking the rock shaft in either direction.

18. In a machine of the character described, the combination of a work support to swing the shoe laterally into position for treatment, a rock shaft for swinging the shoe support, a yoke for rocking the rock shaft, an arm connected to the yoke at each side of the rock shaft, means acting normally through both of said arms to hold the shaft in position with the work support central of the machine, and right and left treadle actuated devices for freeing either of said arms from said means to permit said means to act effectively through the other of said arms and rock the shaft.

19. In a machine of the character described, the combination of a work support, side gages for determining the lateral swing of the shoe, a rock shaft for moving said gages singly into operative position, arms acting on opposite sides of the rock shaft, means acting normally through both of said arms to hold the shaft in a fixed position, and right and left treadle actuated devices for freeing one of said arms from the said means to permit said means to act effectively through the other of said arms to rock the rock shaft.

20. In a machine of the class described, the combination, with an angularly movable shoe support, a forepart gage, and counter clamps, of a single spring operated means for positioning the support and gage and clamping the shoe within the counter clamps.

21. In a machine of the class described, the combination, with an angularly movable shoe support, a forepart gage, and counter clamps, of a single spring operated means for positioning the support and gage and clamping the shoe within the counter clamps, and treadle operated means for controlling the action of said single means.

22. In a machine of the class described, the combination of a work support, means for raising and lowering said support, actuating means for raising the counter clamps independently of the work support into different vertical positions, and means controlled by the support for limiting the action of said actuating means.

23. In a machine of the character described, the combination of a horizontally movable work support, counter clamps, means acting to move the counter clamps vertically independent of work support movement, and a trip to free the counter clamps to the action of said means as the shoe support is moved to position the shoe.

24. In a machine of the character described, the combination of a work support, counter clamps, a spring actuated lever for raising the counter clamps, a link connecting the lever and counter clamps, and a stop, as 74, connected to the work support for limiting the upward movement of the counter clamps.

25. In a machine of the character described, the combination of a shoe support, counter clamps for engaging the shoe on said support, means for raising the counter clamps into clamping position, and means independent of the shoe support for depressing the counter clamps.

26. In a machine of the character described, the combination of a shoe support, counter clamps for engaging the shoe on said support, means for raising the counter clamps into clamping position, means independent of the shoe support for depressing the counter clamps, and a lock for holding the counter clamps in depressed position.

27. In a machine of the character described, the combination of a shoe support, counter clamps for engaging the shoe on said support, means for raising the counter clamps into clamping position, means independent of the shoe support for depressing the counter clamps, a lock for holding the counter clamps in depressed position, and a trip for freeing the counter clamps from said lock.

28. In a machine of the character described, the combination of a shoe support, counter clamps for engaging the shoe on said support, spring actuated means for raising the counter clamps into clamping position, and means independent of the shoe support for depressing the counter clamps.

29. In a machine of the character described, the combination of a shoe support, counter clamps and side gages, a slide carrying said counter clamps and side gages, means for raising the slide for positioning the counter clamps and side gages with respect to the height of the shoe, and means independent of the shoe support for depressing the slide and counter clamps and side gages.

30. In a machine of the character described, the combination of a shoe support, counter clamps and side gages, a slide carrying said counter clamps and side gages, means for raising the slide for positioning the counter clamps and side gages with respect to the height of the shoe, means independent of the shoe support for depressing the slide and counter clamps and side gages, and means for locking the said parts in depressed position.

31. In a machine of the character described, the combination of a shoe support, counter clamps and side gages, a slide carrying said counter clamps and side gages, means for raising the slide for positioning the counter clamps and side gages with respect to the height of the shoe, means independent of the shoe support for depressing the slide and counter clamps and side gages, and means for moving the counter clamps and side gages on said slide.

32. In a machine of the general character described, the combination of a shoe support, counter clamps and side gages for determining the lateral swing of the shoe, means for raising the counter clamps and side gages with respect to the shoe, and means independent of the shoe support for depressing the counter clamps and side gages.

33. In a machine of the character described, the combination of a shoe support, counter clamps 32, a link 56, lever 58, and spring 60 for moving said clamps vertically relative to the sole of the shoe as the latter is moved toward the counter clamps.

34. In a machine of the character described, the combination of a shoe support, counter clamps 32, a link 56, lever 58, spring 60 for moving said clamps vertically relative to the sole of the shoe as the latter is moved toward the counter clamps, and ratchet and pawl means for holding the counter clamps against vertical movement responsive to said parts 35. In a machine of the character described, the combination of a shoe support, a head in which said support is horizontally movable, means for raising and lowering the head, counter clamps movable vertically independent of work support movement, and a stop movable into different vertical positions with the work support and acting to limit upward movement of the counter clamps.

36. In a machine of the character described, a work support, counter clamps to engage the shoe on said support, means for raising the counter clamps, ratchet and pawl means to restrain movement of the counter clamps responsive to said means, and means actuated as the work support is moved to carry the shoe between the counter clamps for tripping the ratchet and pawl means and freeing the counter clamps to movement by their actuating means.

37. In a machine of the character described, the combination of a work support, side gages for positioning the shoe laterally for treatment, means for moving said gages vertically, ratchet and pawl means to restrain movement of the said gages, and means actuated as the work support is moved between the said gages for tripping the ratchet and pawl means and freeing the gages to movement responsive to their actuating means.

38. In a machine of the character described, the combination of a work support, counter clamps, means acting to raise the counter clamps, ratchet and pawl means for restraining rising movement of the counter clamps, means for tripping the ratchet and pawl means as the shoe is moved toward the counter clamps, and means for depressing the counter clamps and restoring the operative relation of the ratchet and pawl means.

39. In a machine of the class described, the combination of counter clamps, and means to close said clamps upon the shoe, comprising clamp supports, and a spring for acting upon the said clamps to yieldingly move them toward each other, and means for relatively adjusting the counter clamps toward and from each other.

40. In a machine of the character described, the combination of a shoe support, a back stop and counter clamps for engaging the shoe on said support, means for raising the back stop and counter clamps as the shoe is moved toward them, and means independent of the shoe support for depressing the counter clamps and back stop.

41. In a machine of the character described, the combination of a shoe support, a back stop and counter clamps for engaging the shoe on said support, means for raising the back stop and counter clamps as the shoe is moved toward them, means independent of the shoe support for depressing the counter clamps and back stop, and a lock for holding the back stop and counter clamps in depressed position.

42. In a machine of the character described, the combination of a horizontally sliding shoe support, a lock for holding the support in inoperative position, a spring for moving the work support to operative position when freed from said lock, and means for easing the tension of said spring as the work support is moved to inoperative position.

43. In a machine of the character described, the combination of a horizontally sliding shoe support, a lock for holding the support in inoperative position, a spring for moving the work support to operative position when freed from said lock, and means for moving the shoe support from operative position.

44. In a machine of the character described, the combination of a horizontally sliding shoe support, a lock for holding the support in inoperative position, a spring for moving the work support to operative position when freed from said lock, and means for placing said spring under tension prior to movement of the shoe support to operative position.

45. In a machine of the character described, the combination of a horizontally sliding shoe support, means for moving the shoe support from operative to inoperative position, a lock for holding the shoe support in inoperative position, and a spring connecting the shoe support and said means and put under tension by said means after moving the shoe support from operative position, said spring acting to return the shoe support to operative position when released from said lock.

46. In a machine of the character described, the combination of a shoe support mounted to swing laterally in positioning a shoe, a rock shaft for swinging the shoe support, an arm on said rock shaft, a carriage having a slotted member embracing the rock shaft and said arm, said slot having an irregular wave portion, and means for operating said carriage.

In testimony whereof, I have signed my name to this specification, in the presence of two subscribing witnesses.

THOMAS G. PLANT.

Witnesses:
ALFRED H. HANDLEY,
ANNA L. HAGGERTY.